United States Patent
Triebes et al.

(10) Patent No.: US 7,052,642 B2
(45) Date of Patent: May 30, 2006

(54) COMPOSITION FOR FORMING AN ELASTOMERIC ARTICLE

(75) Inventors: T. Greg Triebes, Alpharetta, GA (US); Kermit R. Littleton, Elijay, GA (US); Robert A. Janssen, Alpharetta, GA (US); Roger Bradshaw Quincy, III, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/458,841

(22) Filed: Jun. 11, 2003

(65) Prior Publication Data

US 2004/0253459 A1    Dec. 16, 2004

(51) Int. Cl.
*B28B 1/38* (2006.01)
(52) U.S. Cl. ............ 264/305; 427/387; 427/430.1
(58) Field of Classification Search .......... 428/35.7, 428/447; 264/305; 427/387, 430.1
See application file for complete search history.

(56) References Cited

U.S. PATENT DOCUMENTS

| | | |
|---|---|---|
| 2,755,194 A | 7/1956 | Volkmann et al. |
| 3,382,138 A | 5/1968 | Barth |
| 3,411,982 A | 11/1968 | Kavalir et al. |
| 3,426,099 A | 2/1969 | Freifeld et al. |
| 3,485,787 A | 12/1969 | Haefele et al. |
| 3,740,262 A | 6/1973 | Agostinelli |
| 3,762,978 A | 10/1973 | Holmes et al. |
| 3,808,287 A | 4/1974 | Thomas |
| 3,813,695 A | 6/1974 | Podell, Jr. et al. |
| 3,830,767 A | 8/1974 | Condon |
| 3,872,515 A | 3/1975 | Miner et al. |
| 3,928,271 A | 12/1975 | Matsuda et al. |
| 3,933,702 A | 1/1976 | Caimi et al. |
| 3,971,745 A | 7/1976 | Carlson et al. |
| 3,975,294 A | 8/1976 | Dumoulin |
| 3,991,026 A | 11/1976 | Matsuda et al. |
| 3,992,221 A | 11/1976 | Homsy et al. |
| 4,006,116 A | 2/1977 | Dominguez |
| 4,016,122 A | 4/1977 | Matsuda et al. |
| 4,016,123 A | 4/1977 | Matsuda et al. |
| 4,027,060 A | 5/1977 | Esemplare et al. |
| 4,039,629 A | 8/1977 | Himes et al. |
| 4,041,103 A | 8/1977 | Davison et al. |
| 4,052,331 A | 10/1977 | Dumoulin |
| 4,061,709 A | 12/1977 | Miller et al. |
| 4,070,713 A | 1/1978 | Stockum |
| 4,082,862 A | 4/1978 | Esemplare et al. |
| 4,143,109 A | 3/1979 | Stockum |
| 4,146,499 A | 3/1979 | Rosano |

(Continued)

FOREIGN PATENT DOCUMENTS

DE     19618006 A1 *   11/1997

(Continued)

OTHER PUBLICATIONS

ASTM D412-98A, "Standard Test Methods for Vulcanized Rubber and Thermoplastic Elastomers-Tension", Jul. 1998, pp. 1-13.

(Continued)

*Primary Examiner*—Michael C. Miggins
(74) *Attorney, Agent, or Firm*—Dana E. Stano; Vincent T. Kung (57) ABSTRACT

A composition for forming an elastomeric article is disclosed. The composition includes an elastomeric material and a film leveler, where the film leveler is present in an amount of from about 0.05% to about 5.0% by mass of the composition.

11 Claims, 2 Drawing Sheets

U.S. PATENT DOCUMENTS

| | | |
|---|---|---|
| 4,156,066 A | 5/1979 | Gould |
| 4,156,067 A | 5/1979 | Gould |
| 4,167,507 A | 9/1979 | Haaf |
| 4,248,751 A | 2/1981 | Willing |
| 4,255,296 A | 3/1981 | Ogawa et al. |
| 4,260,530 A | 4/1981 | Reischl et al. |
| 4,302,852 A | 12/1981 | Joung |
| 4,304,008 A | 12/1981 | Joung |
| 4,309,557 A | 1/1982 | Compton et al. |
| 4,310,928 A | 1/1982 | Joung |
| 4,329,312 A | 5/1982 | Ganz |
| 4,359,558 A | 11/1982 | Gould et al. |
| 4,367,302 A | 1/1983 | Le Roy et al. |
| 4,386,179 A | 5/1983 | Sterling |
| 4,394,473 A | 7/1983 | Winter et al. |
| 4,434,126 A | 2/1984 | McGary, Jr. et al. |
| 4,448,922 A | 5/1984 | McCartney |
| 4,451,635 A | 5/1984 | Gould et al. |
| 4,463,156 A | 7/1984 | McGary, Jr. et al. |
| 4,472,291 A | 9/1984 | Rosano |
| 4,481,323 A | 11/1984 | Sterling |
| 4,482,571 A | 11/1984 | Abraham |
| 4,499,154 A | 2/1985 | James et al. |
| 4,511,354 A | 4/1985 | Sterling |
| 4,548,844 A | 10/1985 | Podell et al. |
| 4,576,156 A | 3/1986 | Dyck et al. |
| 4,597,108 A | 7/1986 | Momose |
| 4,613,640 A | 9/1986 | Deisler et al. |
| 4,620,878 A | 11/1986 | Gee |
| 4,660,228 A | 4/1987 | Ogawa et al. |
| 4,670,330 A | 6/1987 | Ishiwata |
| 4,670,500 A | 6/1987 | Gupta |
| 4,684,490 A | 8/1987 | Taller et al. |
| 4,755,337 A | 7/1988 | Takahashi et al. |
| 4,777,224 A | 10/1988 | Gorzynski et al. |
| 4,783,857 A | 11/1988 | Suzuki et al. |
| 4,789,720 A | 12/1988 | Teffenhart |
| 4,810,543 A | 3/1989 | Gould et al. |
| 4,851,266 A | 7/1989 | Momose et al. |
| 4,857,565 A | 8/1989 | Henning et al. |
| 4,882,378 A | 11/1989 | Himes |
| 4,888,829 A | 12/1989 | Kleinerman et al. |
| 4,902,558 A | 2/1990 | Henriksen |
| 4,917,850 A | 4/1990 | Gray |
| 4,920,172 A | 4/1990 | Daoud |
| 4,947,487 A | 8/1990 | Saffer et al. |
| 4,957,970 A | 9/1990 | Holsapple et al. |
| 4,983,662 A | 1/1991 | Overbeek et al. |
| 5,011,409 A | 4/1991 | Gray |
| 5,014,361 A | 5/1991 | Gray |
| 5,014,362 A | 5/1991 | Tillotson et al. |
| 5,020,162 A | 6/1991 | Kersten et al. |
| 5,026,607 A | 6/1991 | Kiezulas |
| 5,039,750 A | 8/1991 | Miller et al. |
| 5,068,138 A | 11/1991 | Mitchell et al. |
| 5,069,965 A | 12/1991 | Esemplare |
| 5,079,300 A | 1/1992 | Dubrow et al. |
| 5,084,514 A | 1/1992 | Szczechura et al. |
| 5,088,125 A | 2/1992 | Ansell et al. |
| 5,089,205 A | 2/1992 | Huang et al. |
| 5,112,900 A | 5/1992 | Buddenhagen et al. |
| 5,120,816 A | 6/1992 | Gould et al. |
| 5,132,129 A | 7/1992 | Potter et al. |
| 5,138,719 A | 8/1992 | Orlianges et al. |
| 5,146,628 A | 9/1992 | Herrmann et al. |
| 5,164,231 A | 11/1992 | Davis |
| 5,169,571 A | 12/1992 | Buckley |
| 5,171,809 A | 12/1992 | Hilty et al. |
| 5,195,537 A | 3/1993 | Tillotson |
| 5,196,263 A | 3/1993 | Melby et al. |
| 5,202,368 A | 4/1993 | Davies et al. |
| 5,214,095 A | 5/1993 | Lavoie |
| 5,227,242 A | 7/1993 | Walter et al. |
| 5,228,947 A | 7/1993 | Churchland |
| 5,272,012 A | 12/1993 | Opolski |
| 5,272,771 A | 12/1993 | Ansell et al. |
| 5,277,976 A | 1/1994 | Hogle et al. |
| 5,284,607 A | 2/1994 | Chen |
| 5,302,440 A | 4/1994 | Davis |
| 5,306,558 A | 4/1994 | Takahashi et al. |
| 5,310,517 A | 5/1994 | Dams et al. |
| 5,332,612 A | 7/1994 | Payet et al. |
| 5,338,169 A | 8/1994 | Buckley |
| 5,343,586 A | 9/1994 | Vosbikian |
| 5,370,900 A | 12/1994 | Chen |
| 5,391,343 A | 2/1995 | Dreibelbis et al. |
| 5,395,666 A | 3/1995 | Brindle |
| 5,399,400 A | 3/1995 | Nile et al. |
| 5,405,666 A | 4/1995 | Brindle |
| 5,407,715 A | 4/1995 | Buddenhagen et al. |
| 5,409,739 A | 4/1995 | Liu |
| 5,429,686 A | 7/1995 | Chiu et al. |
| 5,438,709 A | 8/1995 | Green et al. |
| 5,444,121 A | 8/1995 | Grennes et al. |
| 5,458,588 A | 10/1995 | Amdur et al. |
| 5,458,936 A | 10/1995 | Miller et al. |
| 5,534,350 A | 7/1996 | Liou |
| 5,536,921 A | 7/1996 | Hedrick et al. |
| 5,545,451 A | 8/1996 | Haung et al. |
| 5,548,862 A | 8/1996 | Curtis |
| 5,554,673 A | 9/1996 | Shah |
| 5,570,475 A | 11/1996 | Nile et al. |
| 5,571,219 A | 11/1996 | Gorton |
| 5,571,567 A | 11/1996 | Shah |
| 5,573,637 A | 11/1996 | Ampulski et al. |
| 5,576,382 A | 11/1996 | Seneker et al. |
| 5,595,628 A | 1/1997 | Gordon et al. |
| 5,601,870 A | 2/1997 | Haung et al. |
| 5,607,980 A | 3/1997 | McAtee et al. |
| 5,609,727 A | 3/1997 | Hansen et al. |
| 5,612,083 A | 3/1997 | Haung et al. |
| 5,614,293 A | 3/1997 | Krzysik et al. |
| 5,620,773 A | 4/1997 | Nash |
| 5,625,900 A | 5/1997 | Hayes |
| 5,643,588 A | 7/1997 | Roe et al. |
| 5,644,798 A | 7/1997 | Shah |
| 5,649,326 A | 7/1997 | Richard, Jr. et al. |
| 5,650,218 A | 7/1997 | Krzysik et al. |
| 5,650,225 A | 7/1997 | Dutta et al. |
| 5,661,208 A | 8/1997 | Estes |
| RE35,616 E | 9/1997 | Tillotson et al. |
| 5,663,213 A | 9/1997 | Jones et al. |
| 5,674,818 A | 10/1997 | Garcia Puig et al. |
| 5,691,069 A | 11/1997 | Lee |
| 5,700,585 A | 12/1997 | Lee |
| 5,706,522 A | 1/1998 | Ballarino et al. |
| 5,712,346 A | 1/1998 | Lee |
| 5,716,692 A | 2/1998 | Warner et al. |
| 5,728,063 A | 3/1998 | Preissman et al. |
| 5,728,065 A | 3/1998 | Follmer et al. |
| 5,728,340 A | 3/1998 | Dreibelbis et al. |
| 5,736,251 A | 4/1998 | Pinchuk |
| 5,742,943 A | 4/1998 | Chen |
| 5,759,173 A | 6/1998 | Preissman et al. |
| 5,789,354 A | 8/1998 | Mikami et al. |
| 5,792,531 A | 8/1998 | Littleton et al. |
| 5,804,318 A | 9/1998 | Pinchuk et al. |
| 5,807,921 A | 9/1998 | Hill et al. |
| 5,833,915 A | 11/1998 | Shah |
| 5,849,000 A | 12/1998 | Anjur et al. |
| 5,851,683 A | 12/1998 | Plamthottam et al. |
| 5,864,913 A | 2/1999 | Robertson et al. |
| 5,881,386 A | 3/1999 | Horwege et al. |
| 5,881,387 A | 3/1999 | Merovitz et al. |

| | | |
|---|---|---|
| 5,886,089 A | 3/1999 | Knowlton |
| 5,900,452 A | 5/1999 | Plamthottam |
| 5,906,823 A | 5/1999 | Mixon |
| 5,913,871 A | 6/1999 | Werneth et al. |
| 5,916,203 A | 6/1999 | Brandon et al. |
| 5,916,678 A | 6/1999 | Jackson et al. |
| 5,920,942 A | 7/1999 | Footer |
| 5,931,774 A | 8/1999 | Williams et al. |
| 5,948,710 A | 9/1999 | Pomplun et al. |
| 5,958,178 A | 9/1999 | Bartsch et al. |
| 5,958,275 A | 9/1999 | Joines et al. |
| 5,958,558 A | 9/1999 | Giesfeldt et al. |
| 5,962,620 A | 10/1999 | Reich et al. |
| 5,965,276 A | 10/1999 | Shlenker et al. |
| 5,974,589 A | 11/1999 | Pugh et al. |
| 5,977,223 A | 11/1999 | Ryan et al. |
| 5,985,392 A | 11/1999 | Hert et al. |
| 5,985,955 A | 11/1999 | Bechara et al. |
| 5,987,685 A | 11/1999 | Lambert |
| 5,991,926 A | 11/1999 | Lakusiewicz |
| 5,993,923 A | 11/1999 | Lee |
| 5,993,972 A | 11/1999 | Reich et al. |
| 5,997,969 A | 12/1999 | Gardon |
| 5,998,540 A | 12/1999 | Lipkin et al. |
| 6,000,089 A | 12/1999 | Renken |
| 6,001,300 A | 12/1999 | Buckley |
| 6,016,570 A | 1/2000 | Vande Pol et al. |
| 6,017,997 A | 1/2000 | Snow et al. |
| 6,019,922 A | 2/2000 | Hassan et al. |
| 6,020,580 A | 2/2000 | Lewis et al. |
| 6,021,524 A | 2/2000 | Wu et al. |
| 6,044,513 A | 4/2000 | Penn |
| 6,048,932 A | 4/2000 | Okada et al. |
| 6,051,320 A | 4/2000 | Noecker et al. |
| 6,082,915 A | 7/2000 | Kimmel |
| 6,120,477 A | 9/2000 | Campbell et al. |
| 6,136,039 A | 10/2000 | Kristinsson et al. |
| 6,143,416 A | 11/2000 | Brindle et al. |
| 6,160,151 A | 12/2000 | Compton et al. |
| 6,243,938 B1 | 6/2001 | Lubrecht |
| 6,254,947 B1 | 7/2001 | Schaller |
| 6,264,791 B1 | 7/2001 | Sun et al. |
| 6,284,856 B1 | 9/2001 | Lee |
| 6,288,109 B1 | 9/2001 | Chatterjee et al. |
| 6,288,159 B1 | 9/2001 | Plamthottam |
| 6,306,514 B1 * | 10/2001 | Weikel et al. ............ 428/451 |
| 6,316,541 B1 | 11/2001 | Gee |
| 6,322,665 B1 | 11/2001 | Sun et al. |
| 6,345,394 B1 | 2/2002 | Nakamura et al. |
| 6,346,583 B1 * | 2/2002 | Kilgour et al. ............ 525/474 |
| 6,347,408 B1 | 2/2002 | Yeh |
| 6,378,137 B1 | 4/2002 | Hassan et al. |
| 6,389,602 B1 | 5/2002 | Alsaffar |
| 6,391,963 B1 | 5/2002 | Nishiyama |
| 6,414,083 B1 | 7/2002 | Plamthottam |
| 6,730,380 B1 | 5/2004 | Littleton et al. |
| 2002/0015812 A1 | 2/2002 | Littleton et al. |
| 2002/0029402 A1 | 3/2002 | Yeh |
| 2003/0118761 A1 * | 6/2003 | Triebes et al. ............ 428/35.7 |
| 2003/0118837 A1 | 6/2003 | Modha et al. |
| 2003/0226191 A1 | 12/2003 | Modha et al. |

FOREIGN PATENT DOCUMENTS

| | | |
|---|---|---|
| EP | 189773 B1 | 8/1986 |
| EP | 0681912 | 11/1995 |
| EP | 0543657 B1 | 1/1996 |
| EP | 0815880 A2 | 1/1998 |
| EP | 0609387 | 7/1999 |
| EP | 0757059 B1 | 12/2002 |
| GB | 912753 | 6/1960 |
| JP | 59150184 A * | 8/1984 |
| WO | WO 81/00345 | 2/1981 |
| WO | WO 89/04647 | 6/1989 |
| WO | WO 93/08236 | 4/1993 |
| WO | WO 93/24068 | 12/1993 |
| WO | WO 96/25278 | 8/1996 |
| WO | WO 99/22686 | 5/1999 |
| WO | WO 00/09320 | 2/2000 |
| WO | WO 00/35978 | 6/2000 |
| WO | WO 00/65083 | 11/2000 |
| WO | WO 00/65084 | 11/2000 |
| WO | WO 00/65096 | 11/2000 |
| WO | WO 00/65347 | 11/2000 |
| WO | WO 00/65348 | 11/2000 |
| WO | WO 01/41700 | 6/2001 |
| WO | WO 01/42250 | 6/2001 |
| WO | WO 01/78620 | 10/2001 |
| WO | WO 02/41815 | 5/2002 |

OTHER PUBLICATIONS

ASTM D3577-00, "Standard Specification for Rubber Surgical Gloves", Jan. 2000, pp. 129-132.
ASTM D573-99, "Standard Test Method for Rubber-Deterioration in an Air Oven", Nov. 1999, pp. 115-119.
MicroPatent Abstract for EP 0544569, Published Jun. 2, 1993.
Derwent Abstract, DE 19618006, Nov. 6, 1997.
Derwent Abstract, JP 59150184A, Aug. 28, 1984.
"Polyurethanes", *Encyclopedia of Polymer Science and Engineering*, vol. 13, Published by Wiley & Sons Inc., 1988, pp. 277, 292, 293.
Product Profile—NuSil Silicone Technology; High Technology Silicone Primer (Clear), CF1-135, May 7, 2001.
Product Profile—NuSil Silicone Technology; High Technology Silicone Primer (Clear); CF2-135, May 14, 2001.
Product Profile—NuSil Silicone Technology; Addition Cure High Tear Silicone Dispersion; MED 10-6640; Jun. 25, 2001.
Product Profile—NuSil Silicone Technology; Addition Cure Silicone Dispersion; MED 10-6400; Jun. 25, 2001.
Product Profile—NuSil Silicone Technology; Addition Cure Silicone Dispersion; MED 10-6600; Jun. 25, 2001.

* cited by examiner

COMPOSITION FOR FORMING AN ELASTOMERIC ARTICLE

BACKGROUND

Highly elastic articles such as surgical and examination gloves have traditionally been formed from natural rubber latex due to its combination of good elasticity and strength. In recent years, synthetic gloves with comparable properties have been introduced for such applications. Many of these gloves are formed from solvent-based processes that are prone to variability in film thickness and shape. Various factors impact such variability, such as dwell time in the polymer bath, the polymer used in the polymer composition, drying time, and so forth. While process conditions may be altered to reduce such effects, a need remains for a composition that substantially improves the uniformity of the resulting article.

SUMMARY OF THE INVENTION

The present invention relates to a composition for forming an elastomeric article having improved uniformity and fewer defects. The composition includes an elastomeric material and a silicone polyether. The elastomeric material may include a styrene-ethylene-butylene-styrene block copolymer, styrene-butadiene-styrene block copolymer, natural rubber, nitrile butadiene rubber, styrene-isoprene-styrene block copolymer, styrene-isoprene block copolymer, styrene-butadiene block copolymer, synthetic isoprene, chloroprene rubber, polyvinyl chloride, silicone rubber, or a combination thereof. The silicone polyether may be present in any suitable amount, and in some instances, may be present in an amount of from about 0.05 mass % to about 5 mass % of the composition. In other instances, the silicone polyether may be present in an amount of from about 0.1 mass % to about 3 mass % of the composition. In yet other instances, the silicone polyether may be present in an amount of from about 0.15 mass % to about 1 mass % of the composition. In yet other instances, the silicone polyether may be present in an amount of from about 0.2 mass % to about 0.5 mass % of the composition. In one such instance, the silicone polyether may be present in an amount of about 0.4 mass % of the composition.

The present invention further relates to an elastomeric article. The article includes a substrate body formed from an elastomeric material selected from the group consisting of a styrene-ethylene-butylene-styrene block copolymer, natural rubber, nitrile butadiene rubber, styrene-isoprene-styrene block copolymer, styrene-butadiene-styrene block copolymer, styrene-isoprene block copolymer, styrene-butadiene block copolymer, synthetic isoprene, chloroprene rubber, polyvinyl chloride, silicone rubber, or a combination thereof. The article also includes a layer overlying at least a portion of the substrate body, where the layer is formed from a silicone polyether. In some instances, the layer may be a donning layer. In other instances, the layer may be a gripping layer.

The present invention further relates to a method for preparing an elastomeric article. The method includes preparing a substrate body from a composition including an elastomeric material and a silicone polyether, and forming a layer over at least a portion of the substrate body, the layer comprising a styrene-butadiene-styrene block copolymer. The silicone polyether may be present in an amount of from about 0.05 mass % to about 5 mass % of the composition.

The present invention also relates to a method for preparing an elastomeric glove. The method includes providing a hand-shaped glove former, dipping the former into a gripping layer composition including a first styrene-butadiene-styrene block copolymer and a first silicone polyether, dipping the former into a substrate body composition including a styrene-ethylene-butylene-styrene block copolymer and a second silicone polyether, and dipping the former into a donning layer composition including a second styrene-butadiene-styrene block copolymer and a third silicone polyether. The first styrene-butadiene-styrene block copolymer and the second styrene-butadiene-styrene block copolymer may be chemically identical. Likewise, the first silicone polyether, the second silicone polyether, and the third silicone polyether may be chemically identical. In some instances, the first silicone polyether may be present in an amount of from about 0.05 mass % to about 5 mass % of the gripping layer composition. In some instances, the second silicone polyether may be present in an amount of from about 0.05 mass % to about 5 mass % of the substrate body composition. In some instances, the third silicone polyether may be present in an amount of from about 0.05 mass % to about 5 mass % of the donning layer composition.

DESCRIPTION

The present invention generally relates to a composition for forming an elastomeric article, such as a condom or glove, and an article formed therefrom. As used herein, the term "elastomeric article" refers to an article formed predominantly from an elastomeric material. As used herein, the term "elastomeric material" refers to a polymeric material that is capable of being easily stretched or expanded, and will substantially return to its previous shape upon release of the stretching or expanding force.

The composition of the present invention generally includes an elastomeric material and a film leveler. As used herein, a "film leveler" refers to an agent that tends to improve the uniformity of a film formed from a polymer. For example, in a glove, the presence of the film leveler promotes uniform thickness and few or no defects, such as pinholes, bubbles, or waves. Furthermore, the presence of the film leveler reduces the number of defects in the spaces between the fingers of the glove (i.e., the "finger crotches").

Any suitable film leveler or combination of film levelers may be used as desired. In some embodiments, the film leveler may include a silicone or silicone-based component. As used herein, "silicone" generally refers to a broad family of synthetic polymers that have a repeating silicon-oxygen backbone, including, but not limited to, polydimethylsiloxane and polysiloxanes having hydrogen-bonding functional groups selected from the group consisting of amino, carboxyl, hydroxyl, ether, polyether, aldehyde, ketone, amide, ester, and thiol groups.

In one such embodiment, the film leveler may include a silicone polyether. As used herein, a "silicone polyether" refers to any member of a class of chemicals having a polydimethylsiloxane backbone modified by the chemical attachment of polyoxyalkene chains. The length of the polydimethylsiloxane backbone and the number, size, and composition of the attached polyoxyalkene chains impact the properties of the silicone polyether.

A wide variety of silicone polyethers are available commercially. One example of a silicone polyether that may be suitable for use with the present invention is available from BASF Corporation (Mount Olive, N.J.) under the trade name MASIL® SF-19 CG Silicone Surfactant ("MASIL® SF-19"). MASIL® SF-19 is believed to contain polyethylene glycol (PEG)-8 dimethicone. Another example of a silicone polyether that may be suitable for use with the present invention is available from Siltech, LLC (Dacula, Ga.) under the trade name MFF 184SW. MFF 184SW is a dimethyl, methyl hydroxy propyl ethoxylated siloxane believed to contain about 10 mass % poly(ethylene oxide propylene oxide) mono allyl ether. Another silicone polyether that may be suitable for use with the present invention is available from Dow Corning Corporation (Midland, Mich.) under the trade name DC Q2-5211 Superwetting Agent ("DC Q2-5211"). DC Q2-5211 is a low molecular weight nonionic silicone polyether surfactant believed to contain greater than 60 mass % methyl (propylhydroxide, ethoxylated) bis(trimethylsiloxy) silane, 15–40 mass % polyethylene oxide monoallyl ether, and less than 13 mass % polyethylene glycol. Still another silicone polyether that may be suitable for use with the present invention is available from Dow Corning Corporation (Midland, Mich.) under the trade name DC 2501 Cosmetic Wax ("DC 2501"). DC 2501 is a water-dispersible dimethicone copolyol wax. Yet another silicone polyether that may be suitable for use with the present invention is available from Dow Corning Corporation (Midland, Mich.) under the trade name DC Q4-3667 Fluid ("DC Q4-3667"). DC Q4-3667 is a silicone polyether believed to contain greater than 60 mass % dimethyl siloxane, ethoxylated 3-hydroxypropyl-terminated, 15–40 mass % polyethylene oxide monoallyl ether, 5–10 mass % polyethylene glycol, 1–5 mass % octamethylcyclotetrasiloxane, 1–5 mass % decamethylcyclopentasiloxane, and 1–5 mass % dimethylcyclosiloxanes. While various exemplary silicone polyethers have been described herein, it should be understood that any suitable silicone polyether may be used as desired.

The film leveler may be added to the polymer composition in any amount suitable to achieve the desired glove characteristics without impacting the glove formation process. If too much film leveler is used, some of the film leveler may migrate from the composition and deposit onto the former, where it may, in some instances, disrupt formation of gloves on that former. The amount needed may depend on the polymer used to form the article, the processing conditions, the desired glove thickness, and so forth. In one embodiment, the film leveler may be present in the polymer composition in an amount of from about 0.05 mass % to about 5.0 mass % of the composition. In another embodiment, the film leveler may be present in the composition in an amount of from about 0.1 mass % to about 3.0 mass % by mass of the composition. In another embodiment, the film leveler may be present in the composition in an amount of from about 0.15 mass % to about 2.0 mass % of the composition. In yet another embodiment, the film leveler may be present in the composition in an amount of from about 0.25 mass % to about 1.0 mass % of the composition. In still another embodiment, the film leveler may be present in an amount of about 0.4 mass % of the composition.

Figure 1:
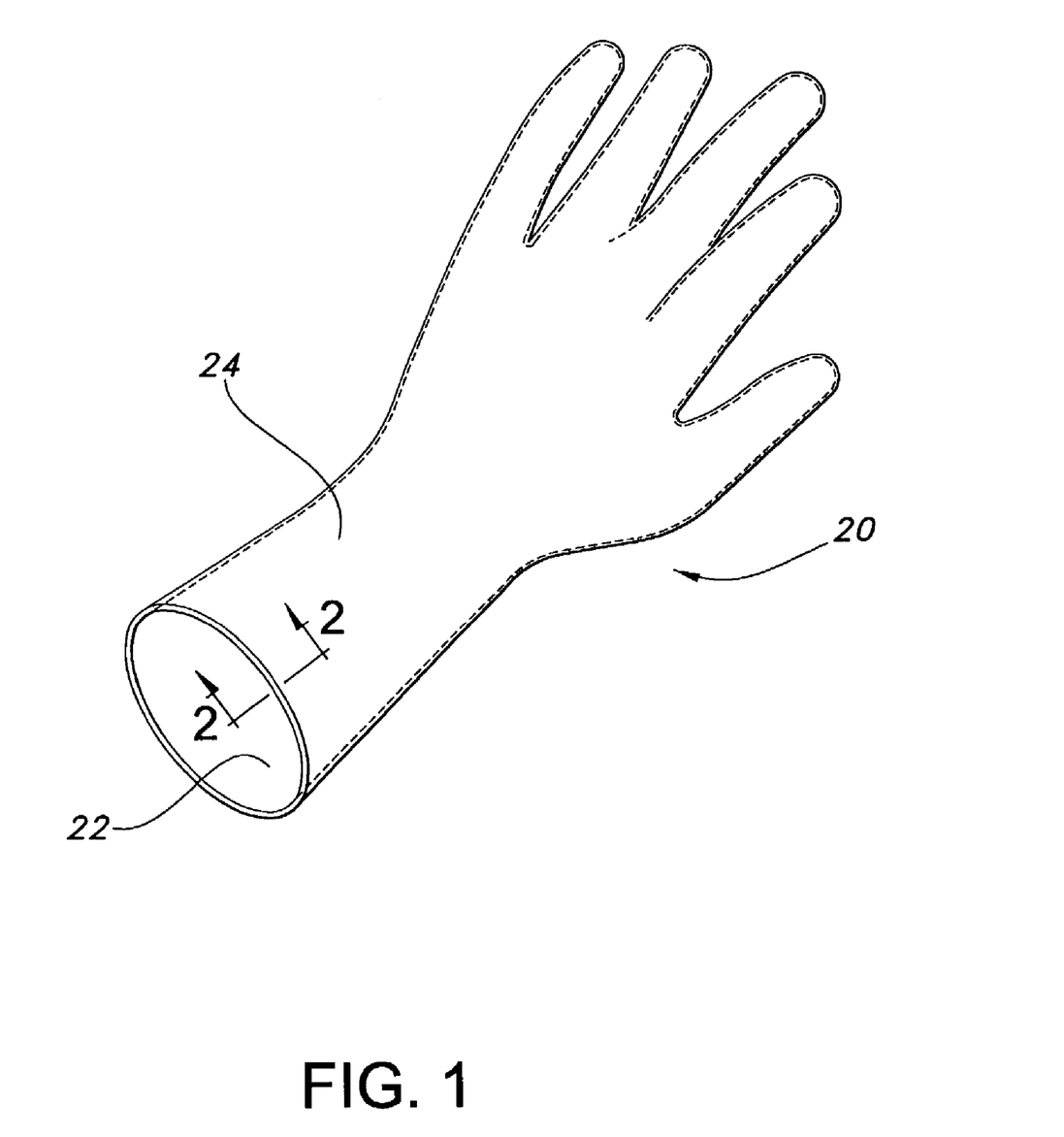
FIG. 1 is a perspective view of an elastomeric article, namely a glove, according to the present invention.
Figure 2A:
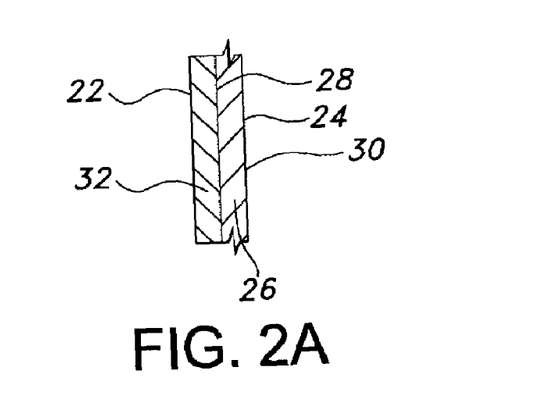
FIG. 2A is an exemplary cross-sectional illustration of the article of FIG. 1 taken along a line 2—2, the article including a substrate body and a donning layer.
Figure 2B:
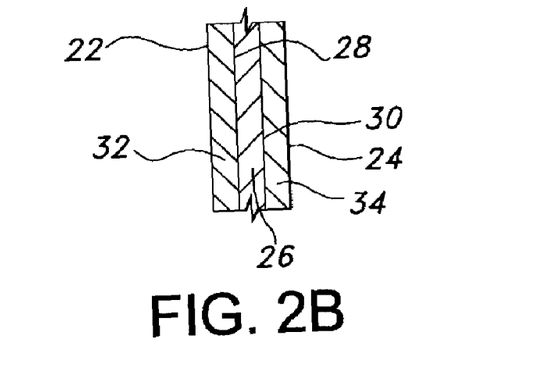
FIG. 2B is an exemplary cross-sectional illustration of the article of FIG. 1 taken along a line 2—2, the article including a substrate body, a donning layer, and a gripping layer.
Figure 2C:
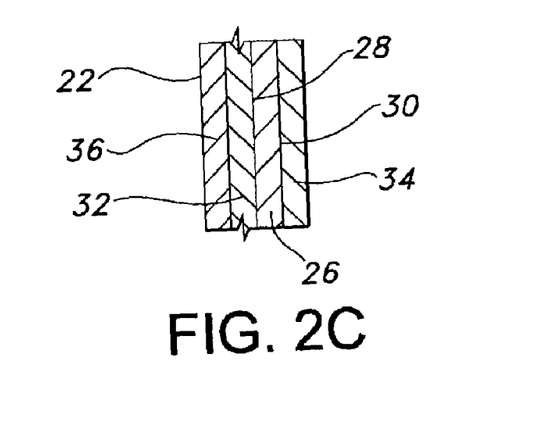
FIG. 2C is an exemplary cross-sectional illustration of the article of FIG. 1 taken along a line 2—2, the article including a substrate body, a donning layer, a gripping layer, and a lubricant layer.

An article made in accordance with the present invention features improved uniformity and quality. Specifically, an article formed using the composition of the present invention offers fewer defects, uniformity in thickness, and fewer failures. As depicted in FIG. 1, the article, for example, glove 20, generally includes an inside surface 22 and an outside surface 24. As used herein, the "inside surface" refers to the surface of the article that contacts the body of the wearer. As used herein, the "outside surface" refers to the surface of the article that is distal from the body of the wearer. The glove includes a substrate body 26 having a first surface 28 and a second surface 30 (FIGS. 2A–2C). As used herein, "first surface" refers to the surface of the substrate body proximal to the body of the wearer. As used herein, "second surface" refers to the surface of the substrate body distal to the body of the wearer.

The article of the present invention may include a single layer or multiple layers as desired. In a single layer glove including only the substrate body, the first surface may be the inside surface of the glove. However, in a multi-layer glove having additional layers proximal to the body of the wearer, the first surface may not be the inside surface of the glove. In a single layer glove including only the substrate body, the second surface may be the outside surface of the glove. However, in a multi-layer glove having additional layers distal from the body of the wearer, the second surface may not be the outside surface of the glove.

For example, as depicted in FIG. 2A, the article may include a donning layer 32 overlying at least a portion of the first surface 28 of the substrate body 26. In such an article, the donning layer 32 forms at least a portion of the inside surface 22 of the glove 20. As depicted in FIG. 2B, the article 20 may also include a gripping layer 34 overlying at least a portion of the second surface 30 of the substrate body 26. In such an article, the gripping layer 34 forms at least a portion of the outside surface 24 of the glove 20. As depicted in FIG. 2C, the article may also include other layers, such as a lubricant layer 36 that overlies at least a portion of the donning layer 32. In such an article, the lubricant layer 36 forms at least a portion of the inside surface 22 of the glove 20.

The article of the present invention may be formed using a variety of processes, for example, dipping, spraying, tumbling, drying, and curing. An exemplary dipping process for forming a glove is described herein, though other processes may be employed to form various articles having different shapes and characteristics. For example, a condom may be formed in substantially the same manner, although some process conditions may differ from those used to form a glove. Furthermore, it should be understood that a batch, semi-batch, or a continuous process may be used with the present invention.

A glove is formed on a hand-shaped mold, termed a "former". The former may be made from any suitable material, such as glass, metal, porcelain, or the like. The surface of the former defines at least a portion of the surface of the glove to be manufactured. In general, the glove is formed by dipping the former into a series of compositions as needed to attain the desired glove characteristics. The glove may be allowed to solidify between layers. Any combination of layers may be used, and although specific layers are described herein, it should be understood that other layers and combinations of layers may be used as desired.

The substrate body 26 (FIGS. 2A–2C) may be formed by dipping the former into a composition including an elastomeric material and a film leveler. Any suitable elastomeric material may be used, and in some embodiments, the elastomeric material may include from a mid block saturated stryenic block copolymer, for example, a styrene-ethylene-butylene-styrene (S-EB-S) block copolymer. In other embodiments, the substrate body may be formed from two or more elastomeric materials. For instance, the body may be formed from two or more S-EB-S block copolymers, such as those described in U.S. Pat. Nos. 5,112,900 and 5,407,715 to Buddenhagen et al., both incorporated herein by reference in their entirety. Examples of S-EB-S polymers that may be suitable for use with the present invention include those commercially available from Kraton Polymers (Houston, Tex.) under the trade name KRATON® 1650 and KRATON® 1651. KRATON® 1650 is believed to contain 30 mass % block styrene. KRATON® 1651 is believed to contain 33 mass % block styrene.

While articles formed from S-EB-S are described in detail herein, it should be understood that any other suitable polymer or combination of polymers may be used with the present invention. For instance, in another embodiment, the elastomeric material may include natural rubber, which may generally be provided as natural rubber latex. In yet another embodiment, the elastomeric material may include nitrile butadiene rubber, and in particular, may include carboxylated nitrile butadiene rubber. In other embodiments, the elastomeric material may include a styrene-isoprene-styrene block copolymer, styrene-butadiene-styrene block copolymer, styrene-isoprene block copolymer, styrene-butadiene block copolymer, synthetic isoprene, chloroprene rubber, polyvinyl chloride, silicone rubber, or a combination thereof.

In one embodiment, the substrate body may be formed using a solvent-based dipping process. Exemplary processes have been described in U.S. Pat. No. 5,112,900 to Buddenhagen et al., U.S. Pat. No. 5,407,715 to Buddenhagen et al., and U.S. Pat. No. 5,792,531 to Littleton et al., each incorporated by reference herein in their entirety, and will be described here only briefly. For example, in such a process, the S-EB-S block copolymer is dissolved in a solvent, for example, toluene, and then mixed with a plasticizer. A glove former is then dipped into the solution and permitted to dry to evaporate the solvent. Several dips may be used as needed to build the desired thickness. The final article may be rinsed or otherwise treated as desired.

In another embodiment, the glove may be formed using an aqueous dispersion-based dipping process. Exemplary processes have been described in U.S. Pat. No. 5,900,452 to Plamthottam and U.S. Pat. No. 6,414,083 to Plamthottam, both incorporated by reference herein in their entirety, and will be described here only briefly. For example, a dispersion medium is prepared from water and a surfactant. Other additives, such as thickeners, defoamers, or buffers may be added to the dispersion medium. Separately, a mixture of the S-EB-S block copolymer, a solvent, and a mineral oil plasticizer is prepared. The two mixtures are then combined under high shear conditions to form the desired dispersion. The solvent is then removed from the dispersion via a suitable stripping process. An elastomeric article is then formed by dipping a former into a volume of the dispersion one or more times to build up the desired thickness, and thereafter evaporating the water to form a film on the surface of the former. The final article may be rinsed or otherwise treated as desired.

As stated above, the composition may further include a film leveler. One such suitable film leveler may include a silicone polyether, such as those described in detail above. The film leveler may be present in any amount needed to achieve the desired film uniformity and defect reduction. Thus, in one embodiment, the substrate body may be formed from a composition including from about 1 mass % to about 40 mass % S-EB-S and from about 0.05 mass % to about 5 mass % silicone polyether. In another embodiment, the substrate body composition may include from about 10 mass % to about 30 mass % S-EB-S and from about 0.1 mass % to about 3 mass % silicone polyether. In yet another embodiment, the substrate body composition may include about 15 mass % to about 25 mass % S-EB-S and from about 0.15 mass % to about 1 mass % silicone polyether. In yet another embodiment the substrate body composition may include from about 17 mass % to about 23 mass % S-EB-S and from about 0.2 mass % to about 0.5 mass % silicone polyether. In yet another embodiment, the substrate body composition may include about 20 mass % S-EB-S and about 0.4 mass % silicone polyether. While exemplary compositions are set forth herein, it should be understood that other polymers and other film levelers may be used in any suitable quantities to form the substrate body as described herein.

After formation of the substrate body 26, the former may be dipped into a bath containing a suitable polymeric material to coat the first surface 28. Such a coating forms at least a portion of donning layer 32 (FIGS. 2A–2C) to facilitate donning of the finished article. The donning layer may be present in any suitable amount, and in some embodiments, the donning layer may be present in an amount of from about 0.1% mass % to about 2.5 mass % of the elastomeric article. In other embodiments, the donning layer may be present in an amount of from about 0.25 mass % to about 1.5 mass % of the elastomeric article. In yet other embodiments, the donning layer may be present in an amount of about 0.5 mass % of the elastomeric article.

The donning layer may be formed from any polymer that facilitates donning of the article, and in some embodiments, includes a block copolymer. One such polymer that may be suitable for use with the present invention is a styrenic block copolymer. In one embodiment, the donning layer may be formed from a styrene-butadiene-styrene (SBS) block copolymer. One example of an SBS polymer that may be suitable for use as a donning layer is commercially available from Dexco Polymers (Houston, Tex.) under the trade name VECTOR® 8508. VECTOR® 8508 is believed to be a linear, pure triblock copolymer (containing less than 1% diblock copolymer) produced using anionic polymerization. Another example of a polymer that may be suitable for use as a donning is also available from Dexco Polymers (Houston, Tex.) under the trade name VECTOR® 8550.

In another embodiment, an unsaturated styrene-isoprene-styrene (SIS) block copolymer having tri- or radial-blocks may be used. In some instances, the SIS block copolymer may have a polystyrene end block content of from about 10 mass % to about 20 mass % of the total weight of the SIS block copolymer. In another embodiment, the SIS block copolymer may have a polystyrene end block content of from about 15 mass % to about 18 mass % of the total mass of the SIS block copolymer. Moreover, the molecular weight of the polystyrene end blocks may be at least about 5,000 grams per mole. Some examples of suitable mid-block unsaturated SIS block copolymers include, but are not limited to, KRATON® D1107 available from Kraton Polymers (Houston, Tex.) and VECTOR® 511 and VECTOR® 4111 available from Dexco Polymers (Houston, Tex.).

Thus, to form the donning layer, the former may be dipped into donning layer composition that includes polymeric material and a film leveler. In another embodiment, the donning layer may be formed by dipping the former into a composition including an elastomeric material, such as SBS, and a film leveler, such as a silicone polyether. In one such embodiment, the donning layer composition may include from about 1 mass % to about 10 mass % SBS and from about 0.05 mass % to about 5 mass % silicone polyether. In another such embodiment, the donning layer composition may include from about 1.5 mass % to about 7 mass % SBS and from about 0.1 mass % to about 3 mass % silicone polyether. In yet another such embodiment, the donning layer composition may include from about 2 mass % to about 5 mass % SBS and from about 0.15 mass % to about 1 mass % silicone polyether. In yet another such embodiment, the donning layer composition may include from about 3 mass % to about 4 mass % SBS and from about 0.2 mass % to about 0.5 mass % silicone polyether. In one exemplary embodiment, the donning layer composition may include about 3.4 mass % SBS and about 0.15 mass % silicone polyether. While exemplary compositions are set forth herein, it should be understood that other polymers and other film levelers may be used in any suitable quantities to form the donning layer as described herein.

Thus, the article of the present invention may include a substrate body 26 and a donning layer 32, where the substrate body 26 is formed from one or more S-EB-S block copolymers, and the donning layer 32 is formed from a SBS block copolymer (FIG. 2A). Either or both layers may contain a film leveler at the same or different levels. For instance, in one embodiment, the article of the present invention may be formed by first dipping a former into a composition including an elastomeric polymer, for example S-EB-S, and a film leveler, for example a silicone polyether, to form a substrate body having the desired thickness, followed by one or more dips into a composition containing SBS and a film leveler, for example a silicone polyether, to form a donning layer. In some embodiments, each dip contains the same film leveler in the same amount. For instance, in some embodiments, each layer is formed from a composition that includes 0.4 mass % of a film leveler, for example, a silicone polyether. In other instances, the amount of film leveler in each composition may differ. For example, in one embodiment, the substrate body composition includes about 0.4 mass % film leveler, and the donning layer composition includes about 0.15 mass % film leveler.

Where desired, the article 20 of the present invention may also include a gripping layer 34 that overlies at least a portion of the second surface 30 of the substrate body (FIG. 2B-2C). The gripping layer enables the wearer to securely grasp articles without excessive tackiness or slipperiness. The gripping layer may be present in any suitable amount, and in some embodiments, the gripping layer may be present in an amount of from about 0.1% mass % to about 2.5 mass % of the elastomeric article. In other embodiments, the gripping layer may be present in an amount of from about 0.25 mass % to about 1.5 mass % of the elastomeric article. In yet other embodiments, the gripping layer may be present in an amount of about 0.5 mass % of the elastomeric article.

The gripping layer may be formed from any polymer, and in some embodiments, the gripping layer may be formed from an unsaturated elastomeric polymer capable of being chlorinated. For instance, the gripping layer may be formed from a styrene-butadiene-styrene block copolymer. One example of an SBS polymer that may be suitable for use as a gripping layer is commercially available from Dexco Polymers (Houston, Tex.) under the trade name VECTOR® 8508, described in detail above. Another example of a polymer that may be suitable for use as a gripping layer is also available from Dexco Polymers (Houston, Tex.) under the trade name VECTOR® 8550.

To form the gripping layer, the former may be dipped into a bath containing a suitable polymeric material prior to formation of the substrate body. In one embodiment, the former may be dipped into a composition that includes a polymeric material. In another embodiment, the former may be dipped into a composition that includes an elastomeric material and a film leveler. In one such embodiment, the gripping layer composition may include from about 1 mass % to about 10 mass % SBS and from about 0.05 mass % to about 5 mass % silicone polyether. In another such embodiment, the gripping layer composition may include from about 1.5 mass % to about 7 mass % SBS and from about 0.1 mass % to about 3 mass % silicone polyether. In yet another such embodiment, the gripping layer composition may include from about 2 mass % to about 5 mass % SBS and from about 0.15 mass % to about 1 mass % silicone polyether. In yet another such embodiment, the gripping layer composition may include from about 3 mass % to about 4 mass % SBS and from about 0.2 mass % to about 0.5 mass % silicone polyether. In one exemplary embodiment, the gripping layer composition may include about 3.4 mass % SBS and about 0.15 mass % silicone polyether. While exemplary compositions are set forth herein, it should be understood that other polymers and other film levelers may be used in any quantities to form the gripping layer as described herein.

Thus, in one embodiment, the article may be formed with three or more different layers, for example a gripping layer, a substrate body, and a donning layer (FIG. 2B). Such an article may be formed, for example, by sequential dips into baths containing SBS, S-EB-S, and SBS. One or more of the compositions contained in each bath may include a film leveler. In one embodiment, each composition includes a film leveler. In some instances, the film leveler may be present in the same amount in each bath. For instance, in some embodiments, each layer is formed from a composition that includes 0.4 mass % of a film leveler, for example, a silicone polyether. In other instances, the amount of film leveler in each composition used to form the layers may differ. For example, in one embodiment, the substrate body composition may include a film leveler in an amount of about 0.4 mass %, the donning layer composition may include a film leveler in an amount of about 0.15 mass %, and the gripping layer composition may include a film leveler in an amount of about 0.15 mass %.

When all of the desired polymer layers have been formed and the glove is solidified, the former may be transferred to a stripping station where the glove is removed from the former. The stripping station may involve automatic or manual removal of the glove from the former. For example, in one embodiment, the glove is manually removed and turned inside out as it is stripped from the former.

The solidified glove may then undergo various post-formation processes. In some instances, the glove may be inverted as needed to expose the donning layer and/or the gripping layer for halogenation. The halogenation (e.g., chlorination) may be performed in any suitable manner known to those skilled in the art. Chlorination generally entails contacting the surface to be chlorinated to a source of chlorine. Such methods include: (1) direct injection of chlorine gas into a water mixture, (2) mixing high density bleaching powder and aluminum chloride in water, (3) brine electrolysis to produce chlorinated water, and (4) acidified bleach. Examples of such methods are described in U.S. Pat. No. 3,411,982 to Kavalir; U.S. Pat. No. 3,740,262 to Agostinelli; U.S. Pat. No. 3,992,221 to Homsy, et al.; U.S. Pat. No. 4,597,108 to Momose; and U.S. Pat. No. 4,851,266 to Momose, U.S. Pat. No. 5,792,531 to Littleton, et al., which are incorporated herein in their entirety by reference. In one embodiment, for example, chlorine gas is injected into a water stream and then fed into a chlorinator (a closed vessel) containing the glove. The concentration of chlorine can be altered to control the degree of chlorination. The chlorine concentration is typically at least about 100 parts per million (ppm), in some embodiments from about 200 ppm to about 3500 ppm, and in some embodiments, from about 300 ppm to about 600 ppm, for example, about 400 ppm. The duration of the chlorination step may also be controlled to vary the degree of chlorination and may range, for example, from about 1 to about 15 minutes, for example, 4 minutes.

Still within the chlorinator, the chlorinated glove may then be rinsed with tap water at about room temperature. This rinse cycle may be repeated as necessary. Once all water is removed, the glove is tumbled to drain the excess water.

Where desired, a lubricant composition may then be added into the chlorinator and tumbled for about five minutes. The lubricant forms a lubricant layer 36 over at least a portion of the donning layer 32 to further enhance donning of the glove 20 (FIG. 2C). Any suitable lubricant may be used with the present invention as described herein.

In one embodiment, the lubricant layer may contain a silicone or silicone-based component. In some embodiments, the lubricant layer may be formed from a polydimethylsiloxane and/or modified polysiloxane. For instance, some suitable modified polysiloxanes that may be suitable for use with the present invention include, but are not limited to, phenyl-modified polysiloxanes, vinyl-modified polysiloxanes, methyl-modified polysiloxanes, fluoro-modified polysiloxanes, alkyl-modified polysiloxanes, alkoxy-modified polysiloxanes, amino-modified polysiloxanes, and combinations thereof.

In some embodiments, the lubricant layer may include a silicone emulsion. One such silicone emulsion that may be suitable for use with the present invention is DC 365, a pre-emulsified silicone (35% TSC) that is commercially available from Dow Corning Corporation (Midland, Mich.). DC 365 is believed to contain 40–70 mass % water, 30–60 mass % methyl-modified polydimethylsiloxane, 1–5 mass % propylene glycol, 1–5 mass % polyethylene glycol sorbitan monolaurate, and 1–5 mass % octylphenoxy polyethoxy ethanol. Another silicone emulsion that may be suitable for use with the present invention is SM 2140, commercially available from GE Silicones (Waterford, N.Y.). SM 2140 is a pre-emulsified silicone (50% TSC) that is believed to contain 30–60 mass % water, 30–60 mass % amino-modified polydimethylsiloxane, 1–5% ethoxylated nonyl phenol, 1–5 mass % trimethyl-4-nonyloxypolyethyleneoxy ethanol, and minor percentages of acetaldehyde, formaldehyde, and 1,4 dioxane. Another silicone emulsion that may be suitable for use with the present invention is SM 2169 available from GE Silicones (Waterford, N.Y.). SM 2169 is a pre-emulsified silicone that is believed to contain 30–60 mass % water, 60–80 mass % polydimethylsiloxane, 1–5 mass % polyoxyethylene lauryl ether, and a small amount of formaldehyde.

Yet another silicone that may be suitable for use with the present invention is commercially available from GE Silicones (Waterford, N.Y.) under the trade name AF-60. AF-60 is believed to contain polydimethylsiloxane, acetylaldehyde, and small percentages of emulsifiers. If desired, these pre-emulsified silicones may be diluted with water or other solvents prior to use.

In another embodiment, the lubricant layer may contain a quaternary ammonium compound, such as that commercially available from Goldschmidt Chemical Corporation of Dublin, Ohio under the trade name VERISOFT® BTMS. VERISOFT® BTMS is believed to contain behnyl trimethyl sulfate and cetyl alcohol. Thus for example, in one embodiment, the lubricant layer includes a quaternary ammonium compound such as VERISOFT® BTMS and a silicone emulsion such as SM 2169.

In other embodiments, the lubricant layer may include, for example, a cationic surfactant (e.g., cetyl pyridinium chloride), an anionic surfactant (e.g., sodium lauryl sulfate), a nonionic surfactant, or the like.

In some embodiments, one or more cationic surfactants may be used. Examples of cationic surfactants that may be suitable for use with the present invention include, for example, behenetrimonium methosulfate, distearyldinonium chloride, dimethyl dioctadecyl ammonium chloride, cetylpyridinium chloride, methylbenzethonium chloride, hexadecylpyridinium chloride, hexadecyltrimethylammonium chloride, benzalkonium chloride, dodecylpyridinium chloride, the corresponding bromides, hydroxyethylheptadecyliridazolium halides, coco aminopropyl betaine, and coconut alkyldimethylammonium betaine. Additional cationic surfactants that may be used include methyl bis (hydrogenated tallow amidoethyl)-2-hydroxyethly ammonium methyl sulfate, methyl bis(tallowamido ethyl)-2-hydroxyethyl ammonium methyl sulfate, methyl bis(soya amidoethyl)-2-hydroxyethyl ammonium methyl sulfate, methyl bis(canola amidoethyl)-2-hydroxyethyl ammonium methyl sulfate, methyl bis(tallowamido ethyl)-2-tallow imidazolinium methyl sulfate, methyl bis(hydrogenated tallowamido ethyl)-2-hydrogenated tallow imidazolinium methyl sulfate, methyl bis(ethyl tallowate)-2-hydroxyethyl ammonium methyl sulfate, methyl bis(ethyl tallowate)-2-hydroxyethyl ammonium methyl sulfate, dihydrogenated tallow dimethyl ammonium chloride, didecyl dimethyl ammonium chloride, dioctyl dimethyl ammonium chloride, octyl decyl dimethyl ammonium chloride diamidoamine ethoxylates, diamidoamine imidazolines, and quaternary ester salts.

In some embodiments, one or more nonionic surfactants may be used. Nonionic surfactants typically have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$–$C_{18}$) acids, condensation products of ethylene oxide with long chain amines or amides, condensation products of ethylene oxide with alcohols, and mixtures thereof.

Specific examples of suitable nonionic surfactants include, but are not limited to, methyl gluceth-10, PEG-20 methyl glucose distearate, PEG-20 methyl glucose sesquistearate, $C_{11-15}$ pareth-20, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$–$C_{22}$) alcohol, including 3 to 20 ethylene oxide moieties, polyoxyethylene-20 isohexadecyl ether, polyoxyethylene-23 glycerol laurate, polyoxy-ethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, oxyethanol, 2,6,8-trimethyl-4-nonyloxypolyethylene oxyethanol; octylphenoxy polyethoxy ethanol, nonylphenoxy polyethoxy ethanol, 2,6,8-trimethyl-4-nonyloxypolyethylene alkyleneoxypolyethyleneoxyethanol, alkyleneoxypolyethyleneoxyethanol, alkyleneoxypolyethyleneoxyethanol, and mixtures thereof.

Additional nonionic surfactants that may be used include water soluble alcohol ethylene oxide condensates that are the condensation products of a secondary aliphatic alcohol containing between about 8 to about 18 carbon atoms in a straight or branched chain configuration condensed with between about 5 to about 30 moles of ethylene oxide. Such nonionic surfactants are commercially available under the trade name TERGITOL® from Union Carbide Corp. (Danbury, Conn.). Specific examples of such commercially available nonionic surfactants of the foregoing type are $C_{11}$–$C_{15}$ secondary alkanols condensed with either 9 moles of ethylene oxide (TERGITOL® 15-S-9) or 12 moles of ethylene oxide (TERGITOL® 15-S-12) marketed by Union Carbide Corp. (Danbury, Conn.).

Other suitable nonionic surfactants include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol. Commercially available nonionic surfactants of this type include IGEPAL® CO-630 (a nonyl phenol ethoxylate) marketed by ISP Corp. (Wayne, N.J.). Suitable nonionic ethoxylated octyl and nonyl phenols include those having from about 7 to about 13 ethoxy units.

In some embodiments, one or more amphoteric surfactants may be used. One class of amphoteric surfactants that may suitable for use with the present invention includes the derivatives of secondary and tertiary amines having aliphatic radicals that are straight chain or branched, where one of the aliphatic substituents contains from about 8 to 18 carbon atoms and at least one of the aliphatic substituents contains an anionic water-solubilizing group, such as a carboxy, sulfonate, or sulfate group. Some examples of amphoteric surfactants include, but are not limited to, sodium 3-(dodecylamino)propionate, sodium 3-(dodecylamino)-propane-1-sulfonate, sodium 2-(dodecylamino)ethyl sulfate, sodium 2-(dimethylamino)octadecanoate, disodium 3-(N-carboxymethyl-dodecylamino)propane-1-sulfonate, sodium 1-carboxymethyl-2-undecylimidazole, disodium octadecyliminodiacetate, and sodium N,N-bis(2-hydroxyethyl)-2-sulfato-3-dodecoxypropylamine.

Additional classes of suitable amphoteric surfactants include phosphobetaines and phosphitaines. For instance, some examples of such amphoteric surfactants include, but are not limited to, sodium coconut N-methyl taurate, sodium oleyl N-methyl taurate, sodium tall oil acid N-methyl taurate, cocodimethylcarboxymethylbetaine, lauryldimethylcarboxymethylbetaine, lauryldimethylcarboxyethylbetaine, cetyldimethylcarboxymethylbetaine, sodium palmitoyl N-methyl taurate, oleyldimethylgammacarboxypropylbetaine, lauryl-bis-(2-hydroxypropyl)-carboxyethylbetaine, di-sodium oleamide PEG-2 sulfosuccinate, laurylamido-bis-(2-hydroxyethyl)propylsultaine, lauryl-bis-(2-hydroxyethyl) carboxymethylbetaine, cocoamidodimethylpropylsultaine, stearylamidodimethylpropylsultaine, TEA oleamido PEG-2 sulfosuccinate, disodium oleamide MEA sulfosuccinate, disodium oleamide MIPA sulfosuccinate, disodium ricinoleamide MEA sulfosuccinate, disodium undecylenamide MEA sulfosuccinate, disodium wheat germamido MEA sulfosuccinate, disodium wheat germamido PEG-2 sulfosuccinate, disodium isostearamideo MEA sulfosuccinate, cocoamido propyl monosodium phosphitaine, lauric myristic amido propyl monosodium phosphitaine, cocoamido disodium 3-hydroxypropyl phosphobetaine, lauric myristic amido disodium 3-hydroxypropyl phosphobetaine, lauric myristic amido glyceryl phosphobetaine, lauric myristic amido carboxy disodium 3-hydroxypropyl phosphobetaine, cocoamphoglycinate, cocoamphocarboxyglycinate, capryloamphocarboxyglycinate, lauroamphocarboxyglycinate, lauroamphoglycinate, capryloamphocarboxypropionate, lauroamphocarboxypropionate, cocoamphopropionate, cocoamphocarboxypropionate, dihydroxyethyl tallow glycinate, and mixtures thereof.

In certain instances, one or more anionic surfactants may be used. Suitable anionic surfactants include, but are not limited to, alkyl sulfates, alkyl ether sulfates, alkyl ether sulfonates, sulfate esters of an alkylphenoxy polyoxyethylene ethanol, alpha-olefin sulfonates, beta-alkoxy alkane sulfonates, alkyllauryl sulfonates, alkyl monoglyceride sulfates, alkyl monoglyceride sulfonates, alkyl carbonates, alkyl ether carboxylates, fatty acids, sulfosuccinates, sarcosinates, octoxynol or nonoxynol phosphates, taurates, fatty taurides, fatty acid amide polyoxyethylene sulfates, isethionates, or mixtures thereof.

Particular examples of some suitable anionic surfactants include, but are not limited to, $C_8$–$C_{18}$ alkyl sulfates, $C_8$–$C_{18}$ fatty acid salts, $C_8$–$C_{18}$ alkyl ether sulfates having one or two moles of ethoxylation, $C_8$–$C_{18}$ alkamine oxides, $C_8$–$C_{18}$ alkoyl sarcosinates, $C_8$–$C_{18}$ sulfoacetates, $C_8$–$C_{18}$ sulfosuccinates, $C_8$–$C_{18}$ alkyl diphenyl oxide disulfonates, $C_8$–$C_{18}$ alkyl carbonates, $C_8$–$C_{18}$ alpha-olefin sulfonates, methyl ester sulfonates, and blends thereof. The $C_8$–$C_{18}$ alkyl group may be straight chain (e.g., lauryl) or branched (e.g., 2-ethylhexyl). The cation of the anionic surfactant may be an alkali metal (e.g., sodium or potassium), ammonium, $C_1$–$C_4$ alkylammonium (e.g., mono-, di-, tri), or $C_1$–$C_3$ alkanolammonium (e.g., mono-, di-, tri).

Specific examples of such anionic surfactants include, but are not limited to, lauryl sulfates, octyl sulfates, 2-ethylhexyl sulfates, lauramine oxide, decyl sulfates, tridecyl sulfates, cocoates, lauroyl sarcosinates, lauryl sulfosuccinates, linear $C_{10}$ diphenyl oxide disulfonates, lauryl sulfosuccinates, lauryl ether sulfates (1 and 2 moles ethylene oxide), myristyl sulfates, oleates, stearates, tallates, ricinoleates, cetyl sulfates, and so forth.

The lubricant solution is then drained from the chlorinator and may be reused if desired. It should be understood that the lubricant composition may be applied at a later stage in the forming process, and may be applied using any technique, such as dipping, spraying, immersion, printing, tumbling, or the like.

The coated glove is then put into a drier and dried for about 10 to 60 minutes (e.g., 40 minutes) at from about 20° C. to about 80° C. (e.g., 40° C.) to dry the donning layer. The glove is then inverted and dried for about 20 to 100 minutes (e.g., 60 minutes) at from about 20° C. to about 80° C. (e.g., 40° C.).

These discoveries are evidenced by the following examples, which are not intended to be limiting in any manner.

EXAMPLE 1

The impact of using a film leveler to form the article of the present invention was demonstrated. Two sets of gloves were prepared, with approximately 5–35 gloves in each set.

Preparation of the Control Gloves

Ceramic formers in the shape of a hand were dipped into a first composition including 3.4 mass % VECTOR® 8508 styrene-butadiene-styrene block copolymer (SBS) available from Dexco Polymers (Houston, Tex.) in toluene and dried.

The formers were then dipped into a second composition including 21.7 mass % of a 50/50 mixture of KRATON® 1650 and KRATON® 1651 available from Kraton Polymers (Houston, Tex.) (plus 67 parts per hundred rubber (phr) mineral oil) in toluene. The formers were then dried.

The formers were then dipped into a third composition including 21.7 mass % of a 50/50 mixture of KRATON® 1650 and KRATON® 1651 (plus 67 parts per hundred rubber (phr) mineral oil) in toluene. The formers were then dried.

The formers were then dipped into a fourth composition including 3.5 mass % VECTOR® 8508 SBS in toluene and dried.

Preparation of the Experimental Gloves

Ceramic formers in the shape of a hand were dipped into a first composition including 3.5 mass % VECTOR® 8508 SBS and 1.5 mass % MASIL® SF-19 in toluene and dried.

The formers were then dipped into a second composition including 21.7 mass % of a 50/50 mixture of KRATON® 1650 and KRATON® 1651 (plus 67 parts per hundred rubber (phr) mineral oil) and 1.5 mass % MASIL® SF-19 in toluene. The formers were then dried.

The same former was then dipped into a third composition including 21.7 mass % of a 50/50 mixture of KRATON® 1650 and KRATON® 1651 (plus 67 parts per hundred rubber (phr) mineral oil) and 1.5 mass % MASIL® SF-19 in toluene. The formers were then dried.

The same former was then dipped into a fourth composition including 3.5 mass % SBS, 1.5 mass % MASIL® SF-19, and toluene and dried.

Throughout each dipping step and after completion of the process, the quality of the accumulated polymer was carefully observed. When compared with the control gloves, the experimental gloves showed a marked improvement in uniformity of thickness and very few, if any defects, particularly between the fingers of the glove. Thus, the presence of the film leveler, in this case the MASIL® SF-19, significantly improved the ability to form a glove.

Furthermore, the gloves were evaluated for tensile strength using ASTM D 412-98A (1998) entitled "Standard Test Methods for Vulcanized Rubber and Thermoplastic Elastomers—Tension". The results were as follows.

|  | Control Gloves | Experimental Gloves | Percent Change (%) |
|---|---|---|---|
| Maximum load (N) | 16.1 | 19.8 | 23 |
| Tensile (MPa) | 28.6 | 30.5 | 6.4 |
| Elongation (%) | 0.93 | 1.02 | 9.6 |

The results indicate that the presence of the film leveler in the compositions significantly improved the tensile strength of the resulting glove.

EXAMPLES 2–11

In each of Examples 2–11, the following procedure was used to form an elastomeric article, namely a glove. A five-dip process was used to evaluate various film levelers in a glove. The details of each experiment follow.

A 175 lb (79.4 kg) solution of elastomeric material was prepared in a Scott Turbon TMS3B75 mixer by combining the following materials in the following order: toluene, KRATON® 1651, KRATON® 1650, and mineral oil. The resulting solution contained about 21 mass % of a 50/50 mixture of KRATON® 1651 and KRATON® 1650 and about 67 phr mineral oil in toluene. This solution was designated as Stock Solution A. The solution was mixed thoroughly. A Stock Solution A was to form the substrate body of the glove.

A 175 lb (79.4 kg) solution of elastomeric material was prepared in a Scott Turbon TMS3B75 mixer by adding about 3.4 mass % VECTOR® 8508 SBS to toluene. The solution was mixed thoroughly and designated as Stock Solution B. Stock Solution B was used to form the donning layer and the gripping layer of the glove.

Dip Solutions 2 and 3 were then prepared by combining Stock Solution A with various amounts of a film leveler. Dip Solutions 1 and 4 were then prepared by mixing Stock Solution B with various amounts of a film leveler. All dip solutions were prepared using a Scott Turbon TMS3B75 mixer under shear conditions.

The former was then dipped into successive dip tanks maintained at a temperature of from about 38° C. to about 58° C. The former was first dipped into Tank 1, which contained Dip Solution 1. The former was then rotated until the polymer was dry. The total time required for this step was about 6 minutes. The former was then dipped into Tank 2, which contained Dip Solution 2, and dried. The total time required for this step was about 24 minutes. The former was then dipped into Tank 3, which contained Dip Solution 3, and dried. The total time required for this step was about 30 minutes. The former was then dipped into Tank 4, which contained Dip Solution 4, and dried. The total time required for this step was about 6 minutes.

A glove bead was then formed on the cuff of the glove using a automatic bead roller.

The former was then dipped into Tank 5, which contained an aqueous slurry of calcium carbonate and a surfactant. This dip facilitates stripping of the glove from the former.

Except as indicated in Examples 2 and 3, each glove was then manually stripped from the former and inspected for defects between the fingers and at the fingertips. A "snap"

gauge micrometer was then used according to ASTM D3577-00 (2000) entitled "Standard Specifications for Rubber Surgical Gloves" to measure the thickness of the palm, cuff, and fingers of each glove. The glove was evaluated according to the following rating system:

| Rating | Characteristics |
|---|---|
| 1 | Very good film leveling, even distribution of film thickness, few or no defects |
| 2 | Good film leveling, superior to formulation without film leveler, some defects |
| 3 | Very good film leveling and even distribution of film thickness, few or no defects but evidence of film leveler migrating to the surface of the glove after aging |
| 4 | Good film leveling, superior to formulation without film leveler, some defects, but evidence of film leveler migrating to the surface of the glove after aging |

EXAMPLE 2

Approximately 5–35 gloves were prepared as described above.

Dip Solutions 2 and 3 were prepared by combining 12.3 lbs (5.6 kg) Stock Solution A and 0.186 lbs (0.084 kg) MASIL® SF-19 as a film leveler to form a solution containing 1.5 mass % MASIL® SF-19. Dip Solutions 1 and 4 were prepared by combining 12.6 lbs (5.7 kg) Stock Solution B and 0.192 lb (0.087 kg) MASIL® SF-19 to form a solution containing 1.5 mass % MASIL® SF-19. The dip solutions were mixed under shear conditions.

After removing each glove from the formers, the gloves were chlorinated using an immersion technique. The gripping layer was chlorinated in a solution of about 200 ppm chlorine. The gloves were then inverted, and the donning layer was chlorinated in a solution of about 1000 ppm chlorine.

A lubricant composition was then applied to the donning layer using a tumbling technique. The lubricant composition contained a quaternary ammonium compound and a silicone in water. The gloves were then dried and inverted.

In addition to the testing described above, an accelerated aging study was performed according to ASTM D573-99 (1999) entitled "Standard Test Method for Rubber—Deterioration in an Air Oven". The samples were evaluated for simulated aging over 2 simulated years at a temperature of 70° C. No bricking or blocking issues were observed. No loss in tensile strength was observed. The glove was rated a "3" according to the system described above.

EXAMPLE 3

Approximately 5–35 gloves were prepared as described above. Dip Solutions 2 and 3 were prepared by combining Stock Solution A and MASIL® SF-19 as a film leveler to form a solution containing 0.5 mass % MASIL® SF-19. Dip Solutions 1 and 4 were prepared by combining Stock Solution B and MASIL® SF-19 to form a solution containing 0.5 mass % MASIL® SF-19. The dip solutions were mixed under shear conditions.

After removing each glove from the formers, the gloves were chlorinated using an immersion technique. The gripping layer was chlorinated in solution of about 200 ppm chlorine. The gloves were then inverted, and the donning layer was chlorinated in a solution of about 1000 ppm chlorine.

A lubricant composition was then applied to the donning layer using a tumbling technique. The lubricant composition contained a quaternary ammonium compound and a silicone in water. The glove was then dried and inverted.

In addition to the testing described above, an accelerated aging study was performed according to ASTM D573-99 (1999) entitled "Standard Test Method for Rubber—Deterioration in an Air Ove". The samples were evaluated for simulated aging over 2 simulated years at a temperature of 70° C. No bricking or blocking issues were observed. No loss in tensile strength was observed. The glove was rated a "1" according to the system described above.

EXAMPLE 4

Approximately 5–35 gloves were prepared as described above. Dip Solutions 2 and 3 were prepared by combining Stock Solution A and DC 2501 as a film leveler to form a solution containing 1.5 mass % DC 2501. Dip Solutions 1 and 4 were prepared by combining Stock Solution B and DC 2501 to form a solution containing 1.5 mass % DC 2501. The dip solutions were mixed under shear conditions. The glove was rated a "2" according to the system described above.

EXAMPLE 5

Approximately 5–35 gloves were prepared as described above. Dip Solutions 2 and 3 were prepared by combining Stock Solution A and DC Q4-3667 as a film leveler to form a solution containing 1.5 mass % DC Q4-3667. Dip Solutions 1 and 4 were prepared by combining Stock Solution B and DC Q4-3667 to form a solution containing 1.5 mass % DC Q4-3667. The dip solutions were mixed under shear conditions. The glove was rated a "4" according to the system described above.

EXAMPLE 6

Approximately 5–35 gloves were prepared as described above. Dip Solutions 2 and 3 were prepared by combining Stock Solution A and SILTECH® MFF 184SW as a film leveler to form a solution containing 1.5 mass % SILTECH® MFF 184SW. Dip Solutions 1 and 4 were prepared by combining Stock Solution B and SILTECH® MFF 184SW to form a solution containing 1.5 mass % SILTECH® MFF 184SW. The dip solutions were mixed under shear conditions. The glove was rated a "3" according to the system described above.

EXAMPLE 7

Approximately 5–35 gloves were prepared as described above. Dip Solutions 2 and 3 were prepared by combining Stock Solution A and DC Q2-5211 as a film leveler to form a solution containing 1.5 mass % DC Q2-5211. Dip Solutions 1 and 4 were prepared by combining Stock Solution B and DC Q2-5211 to form a solution containing 1.5 mass % DC Q2-5211. The dip solutions were mixed under shear conditions. The glove was rated a "4" according to the system described above.

EXAMPLE 8

Approximately 5–35 gloves were prepared as described above. Dip Solutions 2 and 3 were prepared by combining Stock Solution A and SILTECH® MFF 184SW as a film leveler to form a solution containing 0.5 mass % SILTECH® MFF 184SW. Dip Solutions 1 and 4 were prepared by combining Stock Solution B and SILTECH® MFF 184SW to form a solution containing 0.5 mass % SILTECH® MFF 184SW. The dip solutions were mixed under shear conditions. The glove was rated a "1" according to the system described above.

EXAMPLE 9

Approximately 5–35 gloves were prepared as described above. Dip Solutions 2 and 3 were prepared by combining Stock Solution A and DC Q2-5211 as a film leveler to form a solution containing 0.5 mass % DC Q2-5211. Dip Solutions 1 and 4 were prepared by combining Stock Solution B and DC Q2-5211 to form a solution containing 0.5 mass % DC Q2-5211. The dip solutions were mixed under shear conditions. The glove was rated a "4" according to the system described above.

EXAMPLE 10

Approximately 5–35 gloves were prepared as described above. Dip Solutions 2 and 3 were prepared by combining Stock Solution A and SILTECH® MFF 184SW as a film leveler to form a solution containing 0.25 mass % SILTECH® MFF 184SW. Dip Solutions 1 and 4 were prepared by combining Stock Solution B and SILTECH® MFF 184SW to form a solution containing 0.25 mass % SILTECH® MFF 184SW. The dip solutions were mixed under shear conditions. The glove was rated a "1" according to the system described above.

EXAMPLE 11

Approximately 5–35 gloves were prepared as described above. Dip Solutions 2 and 3 were prepared by combining Stock Solution A and SILTECH® MFF 184SW as a film leveler to form a solution containing 0.4 mass % SILTECH® MFF 184SW. Dip Solutions 1 and 4 were prepared by combining Stock Solution B and SILTECH® MFF 184SW to form a solution containing 0.15 mass % SILTECH® MFF 184SW. The dip solutions were mixed under shear conditions. The glove was rated a "1" according to the system described above.

In sum, each film leveler evaluated in Examples 2–11 improved formation of the glove. The presence of the film leveler improved the overall process stability and the resulting glove uniformity.

The invention may be embodied in other specific forms without departing from the scope and spirit of the inventive characteristics thereof. The present embodiments therefore are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for preparing an elastomeric glove comprising:

provided a hand-shaped glove former;

dipping the former into a gripping layer composition comprising a first styrene-butadiene-styrene block copolymer and a first silicone polyether;

dipping the former into a substrate body composition comprising a styrene-ethylene-butylene-styrene block copolymer and a second silicone polyether; and dipping the former into a donning layer composition comprising a second styrene-butadiene-styrene block copolymer and a third silicone polyether.

2. The method of claim 1, wherein the first styrene-butadiene-styrene block copolymer and the second styrene-butadiene-styrene block copolymer are chemically identical.

3. The method of claim 1, wherein the first silicone polyether, the second silicone polyether, and the third silicone polyether are chemically identical.

4. The method of claim 1, wherein the first silicone polyether is present in an amount of from about 0.05 mass % to about 5 mass % of the gripping layer composition.

5. The method of claim 1, wherein the second silicone polyether is present in an amount of from about 0.05 mass % to about 5 mass % of the substrate body composition.

6. The method of claim 1, wherein the third silicone polyether is present in an amount of from about 0.05 mass % to about 5 mass % of the donning layer composition.

7. A method for preparing an elastomeric article comprising:

preparing a substrate body from a composition comprising an elastomeric material and a first silicone polyether surfactant; and forming a first layer over at least a portion of said substrate body, said first layer comprising a first styrene-butadiene-styrene block copolymer and a second silicone polyether surfactant, and forming a second layer over at least a portion of said substrate body, said second layer comprising a second styrene-butadiene-styrene block and a third silicone polyether surfactant.

8. The method of claim 7, wherein said elastomeric material is selected from the group consisting of a styrene-ethylene-butylene-styrene block copolymer, styrene-butadiene-styrene block copolymer, natural rubber, nitrile butadiene rubber, styrene-isoprene-styrene block copolymer, styrene-isoprene block copolymer, styrene-butadiene block copolymer, synthetic isoprene, chloroprene rubber, polyvinyl chloride, silicone rubber, and a combination thereof.

9. The method according to claim 7, wherein said first, second, or third silicone polyether surfactant comprises a polyethylene glycol dimethicone.

10. The method of claim 7, wherein said first, second, or third silicone polyether surfactant is present in an amount of from about 0.05 mass % to about 5 mass % of the composition.

11. The method of claim 7, wherein said first, second, or third silicone polyether surfactant is present in an amount of from about 0.1 mass % to about 3 mass % of the composition.

* * * * *